SYNCHRONISING APPARATUS FOR REMOTE TELEVISION CAMERAS

Filed Oct. 18, 1965

INVENTORS
Donald Alexander Pay,
Anthony John Butt
and
John Harwood Deveson
BY Baldwin & Wright
ATTORNEYS United States Patent Office 3,429,994

Patented Feb. 25, 1969

3,429,994
SYNCHRONISING APPARATUS FOR REMOTE TELEVISION CAMERAS

Donald Alexander Pay, West Hanningfield, Essex, Anthony John Butt, Writtle, Essex, and John Harwood Deveson, Chelmsford, Essex, England, assignors to The Marconi Company Limited, London, England, a British company Filed Oct. 18, 1965, Ser. No. 497,334
Claims priority, application Great Britain, Nov. 11, 1964, 45,970/64
U.S. Cl. 178—7.2 10 Claims
Int. Cl. H04n 5/38; H04l 7/08, 7/06

ABSTRACT OF THE DISCLOSURE

A television camera installation including a camera unit at a remote point linked by a cable to a control unit to which line synchronising pulses are applied; a delay device of controlled variable delay situated in the control unit; a deflection unit at the camera fed with pulses from the delay unit via a conductor of the cable to effect line deflection and a phase comparator at the control unit arranged to compare the phase of pulses received, via the same conductor, at the control unit from the camera with the phase of the incoming line synchronising pulses, the output from the phase comparator being used as an error signal to control the delay provided by the delay unit so as to maintain the deflection in the camera in phase.

Figure 1:
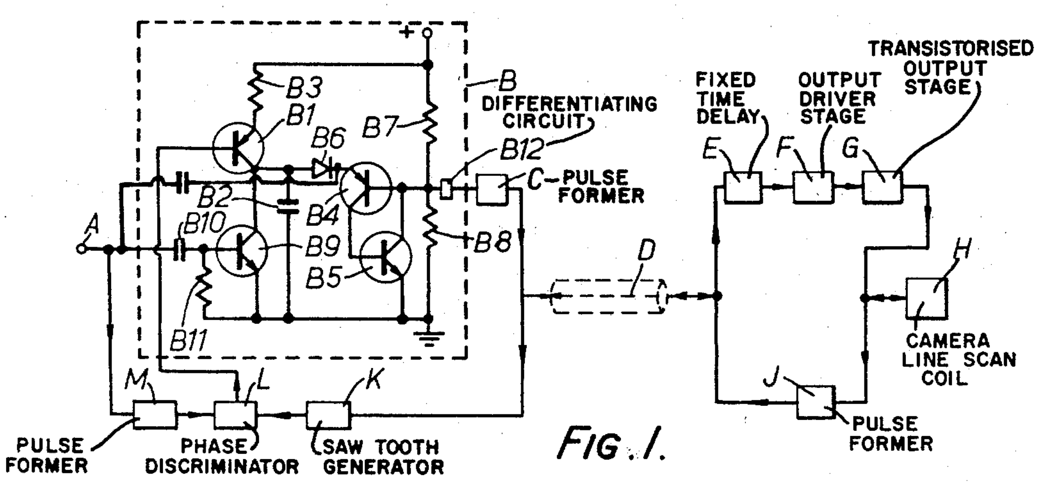

This invention relates to synchronising apparatus for television cameras and has for its object to solve, in a simple satisfactory and economical manner, certain difficult problems which arise in connection with accurate synchronisation of deflection in a television camera when the same camera is required (as is often the case) to be operated at a considerable distance from a control unit at which synchronising pulses are available.

It is, of course, a requirement for satisfactory operation of a television camera that the line deflection in the camera shall be accurately in phase with line pulses available at a control unit. If, as is commonly the case, the camera unit is linked to the control unit by a cable of substantial length down which the pulses from the control unit are fed, the cable itself will introduce an appreciable delay as respects pulses reaching the camera unit. If, as sometimes happens, one cable is replaced by another of different length, the amount of delay will be changed. Again it is becoming increasingly common to supply the pulses actually fed to the deflection coil system of the camera via a transistorised power amplifier in the camera unit but, as is well known, when a cut-off voltage is applied to a transistor the current therethrough is not immediately cut-off but ceases only after a short but appreciable delay. The amount of this delay varies from transistor to transistor and may also vary, with time and with variations of ambient conditions (notable temperature) in the same transistor. It is possible to meet difficulties as respects transistor delay by using a free-running frequency controlled time base generator as a source of line deflection pulses in the camera unit itself and accurately to phase lock this generator by means of pulses fed down the cable. This is, however, an expensive and difficult solution, for it is far from easy to maintain the required accuracy of phase locking under practical conditions and, in any event, there still remains unsolved the problem of cable delay which, of course, affects the pulses fed down the cable. A further problem arises in connection with the cable itself. This has of necessity to incorporate a considerable number of connections (for purposes other than synchronising)

between the control unit and the camera unit and it is important, in the interests of cable flexibility, to keep the number of connections as small as possible. The present invention offers the advantage of requiring only one cable conductor for effecting camera deflection synchronisation and this is an advantage not possessed by many known camera synchronising arrangements.

According to this invention a television camera installation comprising a television camera unit linked by cable to a control unit where line synchronising pulses are available includes, for the purpose of effecting line deflection in camera, a delay device of controllable variable delay situated in the control unit and fed with line synchronising pulses available in said unit; means in said control unit for transmitting down a conductor of the cable pulses of a pre-determined polarity delayed with respect to said line synchronising pulses by an amount determined by said variable delay; means in the camera unit for utilising the pulses fed down said conductor to effect line deflection in the camera in said unit; means also in the camera unit and connected to the deflection system of said camera for transmitting back along the aforesaid cable conductor pulses of opposite polarity to those transmitted down said conductor from the control unit; and a phase comparator situated in said control unit connected and arranged to compare the phase of pulses received in said unit from said conductor with the phase of the available line synchronising pulses, the output from said phase comparator being utilised as an error signal to control the delay provided by the controllable variable delay device so as to maintain the deflection in the camera substantially in correct phase.

Preferably the means for utilising the pulses fed down the cable conductor to effect line deflection in the camera include a transistorised output stage feeding the deflection system of the camera and fed with input derived from said pulses.

It will be seen that, by reason of the action of the phase comparator controlled variable delay device in the control unit, delay due to the length of the cable conductor and delay due to the transistorised output stage (if one is employed) will be automatically compensated even though one or both of these delays may be changed or vary.

Preferably a further delay device, providing a delay which is fixed but may be adjustable, is interposed in the channel between the variable delay device and the camera.

A preferred embodiment of the control unit includes a D.C. voltage controllable variable delay device fed with the available line synchronising pulses, pulse forming means fed with output from said variable delay device and connected to supply pulses of one pre-determined polarity to the control unit end of the cable conductor, a saw tooth generator controlled by pulses of opposite polarity received at the control unit end of the cable conductor and fed thereto from the camera unit, a phase discriminator having one input fed with output from the saw-tooth generator and another input fed with pulses derived from the available line synchronising pulses and adapted to provide an output D.C. voltage representative of the phase relation between its two inputs, and means for applying said D.C. voltage to control the delay of the variable delay device.

A preferred embodiment of the camera unit includes an output stage driver fed with pulses of one pre-determined polarity received at the camera unit end of the cable conductor, a transistorised output stage driven by said driver and driving the deflection system of the camera, and means for deriving from line frequency voltages set up in said deflection system pulses of polarity opposite to said one pre-determined polarity and supply them to the camera unit end of the cable conductor. A fixed delay device, which may be of adjustable delay, may be interposed between the camera unit end of the cable conductor and the output stage driver.

A preferred form of controllable variable delay device comprises a condenser connected in a charging circuit including a first transistor; means for applying control voltage to the base of said transistor to control the charging current rate; a second transistor which is normally cut off and is connected across said condenser; means for applying available line synchronising pulses to the base of said second transistor to render the same momentarily conductive at the commencement of each such pulse; a point of reference potential; a regenerative circuit including two further transistors; and means actuated when the voltage across the condenser exceeds the reference potential for causing said two further transistors temporarily to provide a heavily conducting path across said condenser.

Figure 2:
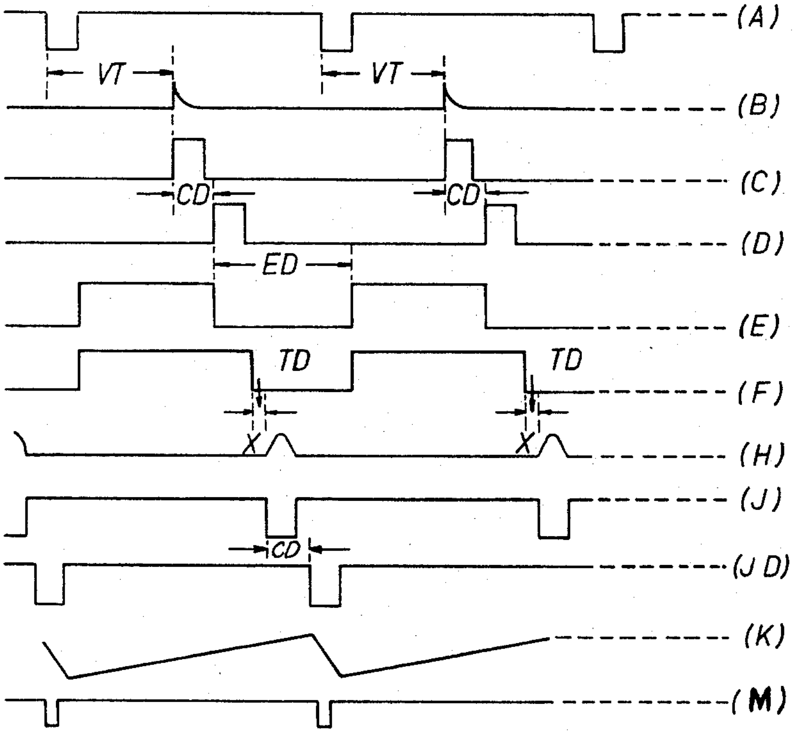
Figure 3:
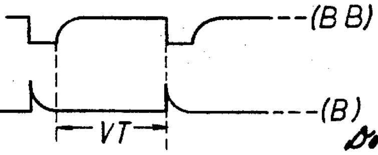

The invention is illustrated in the accompanying drawings in which FIGURE 1 is a diagram, in part circuit diagram and in part block diagram, of one embodiment of the invention and FIGURES 2 and 3 are explanatory graphical figures explanatory of the embodiment of FIGURE 1.

Referring to the drawings synchronizing pulses at the operating television line frequency are derived from the normally provided synchronising pulse generator (not shown) are applied at A to a controlled variable delay pulse generator within the chain block B and which is adapted to provide, in response to an input pulse from A, an output pulse delayed with respect to said input pulse by a variable delay time VT (see FIGURE 2) which is controllable in dependence upon a control voltage applied to said generator B. The generator B will be described in detail later herein. The output pulses from B are applied to a pulse former C. Lines A, B and C of FIGURE 2 represent respectively, the pulses at A, at the input to C and at the output from C. The apparatus so far described is situated in the control unit which may be, in practice, a considerable distance from the camera unit.

The output pulses from C are fed down a conductor in a cable D linking the control unit to the camera unit where they arrive as shown at D in FIGURE 2 delayed by an amount CD due to propagation time in the cable conductor. The delayed pulses are fed to a fixed delay delay device E, such as a monostable multi-vibrator, which delays them still further by an additional delay ED. The output from E is shown at line E of FIGURE 2. The fixed delay device E is not essential but its provision is preferred. Its advantages will be explained later.

A trigger pulse obtained from the fixed delay device E drives an output driver stage F, such as a multivibrator, the output from which is represented at line F of FIGURE 2, and is fed to an output power transistor stage G. The output from the driver stage F is that required to switch the output transistor or transistors at G controlling the line scanning energy for the camera deflection windings in coil unit H. The positive (upward) excursion drives the output transistor or transistors "on," providing scanning current for the latter part of the active line scan period, the current for the earlier part of this period being provided, in well known manner, by a so-called "efficiency" diode assumed to be included in block G. Line H of FIGURE 2 represents the deflector coil semi-sinusoidal voltage wave of the flyback period. This should ideally commence when the waveform F reverses polarity. In practice, however, a delay occurs between the application of the cutting-off drive pulses and the actual cessation of the current flow through the transistor or transistors to which said pulse is applied. The amount of this delay is appreciable and varies from one transistor to another. It may also change with time in the case of a particular transistor in service. This "transistor delay" is indicated in FIGURE 2 at TD.

The deflector coil voltage show at H in FIGURE 2 is fed to a pulse former J the output of which is represented in line J of FIGURE 2. This output is fed back along the same cable conductor D, appearing at the control unit end of the conductor delayed again by the cable delay CD as shown at line JD of FIGURE 2. It is used to trigger a saw-tooth generator provided in block K and the saw-tooth wave represented by line K of FIGURE 2 is fed as one input to a known phase discriminator L the other input to which is represented by line M of FIGURE 2 which is derived via a pulse former M from the line pulse at A. The discriminator L is as known per se and is adapted to produce an output D.C. voltage representative of the phase difference between the saw-tooth and the pulse fed thereto. This output D.C. voltage is used as an error-correcting control signal for the delay pulse generator B to vary the delay thereof in the direction necessary to bring the two input pulses to the discriminator L to the in-phase relation. As will now be apparent, when this relation is established the deflection at coil H is correctly synchronised and unavoidable delays including those due to the cable and the transistor output stage G are automatically compensated for.

The multi-vibrator F driving the output stage G is preferably such that, in its stable state, it produces an output of negative polarity giving an output of positive polarity when triggered to its other quasi-stable state. This has the advantage that if, due to a fault of some kind, it receives no input driving pulses it leaves the output stage G in "off" condition so that there is no risk of over-heating of or damage to the transistor or transistors in stage G in the event of failure of drive input pulses to F. If this safety precaution is not regarded as necessary, in any particular case, the multi-vibrator at F could be arranged to be triggered at time X (see line F of FIGURE 2) with, of course, appropriate re-timing elsewhere.

It will be observed that the pulses of lines C and J of FIGURE 2 are transmitted on the same cable conductor D but they are of opposite polarities and the delay device E is designed to accept only pulses of the polarity of those from pulse former C while the saw tooth generator K is designed to accept only pulses of the polarity of those from pulse former J.

As stated the fixed delay device E (though of fixed delay it may be of adjustable fixed delay) is not essential but it has the advantage of permitting a more convenient timing of the variable delay trigger (from B of FIGURE 1) than might otherwise be possible. For example in some cases it would be of advantage to use the delay device E to displace the timing of the variable delay trigger from the region of the next following line pluse and thus avoid possible "pulling" effects. In the illustrated case it is used to prevent interference between the pulses from C and J which share the common cable conductor D. If the fixed delay device E were not provided and the cable were long enough and itself imposed a long enough delay it would be possible for the pulses travelling towards the camera unit to be sufficiently advanced, in relation to the pulses travelling in the opposite direction, to encroach upon them. The provision of device E prevents this.

FIGURE 1 shows, within block B, a preferred form of variable delay pulse generator. Here a transistor B1 applies to a condenser B2 a charging current which flows through resistance B3 and is of a magnitude dependent on the control potential supplied from L to the base of B1. Further transistors B4 and B5 are connected in a regenerative circuit known per se, the emitter of B4 being connected to the junction point of the collector of B1 with the condenser B2 through a diode B6 sensed as shown. The base of transistor B4 is connected to a tap (from which the output is taken) on a potentiometer constituted by resistances B7, B8 in series across the supply. Until the potential V*c* across condenser B2 exceeds the potential $Vx$ across resistance B8 no current can flow through the path provided by diode B6, the emitter-collector path of B4 and the base-emitter path of B5 to earth nor through the path from the junction point of B7 with B8 and the collector-emitter path of B5. When $Vc$ exceeds $Vx$ the regenerative connection causes transistors B4 and B5 to conduct heavily and they continue so to do until the current flowing into B6 is interrupted. At the start of each line pulse at A, applied via the differentiating circuit comprising condenser B10 and resistor B11 to the base of transistor B9, said transistor, which is normally cut off, is rendered momentarily conducting and, being connected across condenser B2, discharges it to the low saturated potential of the collector-emitter path of B9. When B9 is again cut-off, B2 begins to charge again until $Vc$ again exceeds $Vx$ sufficiently for B4 and B5 to become conducting. Regenerative action then causes the voltage across the condenser B2 and the potential at the junction of B7 with B8 to fall to low values and the current through B1 is then insufficient to maintain B4 and B5 conducting. When B9 is momentarily switched on again by the next line pulse at A the potential $Vc$ is again reduced, the current through B1 is diverted from B4 and B5 to B9 and transistors B4 and B5 cut off again. The resultant output wave form at the junction of B7 with B8 is as shown in line BB of FIGURE 3 (the time scale of which is different from that of FIGURE 2) the delay time obtained being referenced (as in FIGURE 2) VT. As will be seen the more negative the control potential on the base of transistor B1 the smaller the delay VT. The wave form of line BB of FIGURE 3 is converted into the required trigger pulse of line B of FIGURE 2 (also shown in line B of FIGURE 3) by a suitable known differentiating type of circuit within the block B12. The condenser shown between the emitter of B4 and terminal A ensures that the circuit will start reliably on first switching on. This condenser passes the pulses at A to the said emitter making the transistor B4 conduct and producing output pulses at the junction of B7 with B8. Pulses are thus fed to the camera which in turn produces the return pulses JD, establishing normal working conditions in the discriminator L and the variable delay generator B.

It will be seen that the invention provides correctly synchronised deflection at H automatically despite cable delay at D and transistor delay at G; that it avoids all need for a phase locked synchronised frequency controlled free-running oscillator in the camera unit with the attendant difficulties of achieving reliable phase locking under conditions of varying ambient temperatures varying supply voltages and other adverse conditions likely to be encountered in practice; and that it requires, for its operation, only one conductor in the cable between the control unit and the camera unit. This last is a valuable practical advantage because, in practice, this cable has to provide many connections and it is important, in the interests of keeping it flexible, to keep the number of conductors in it as low as possible.

We claim:

1. A television camera installation comprising a television camera unit linked by cable to a control unit where line synchronising pulses are available, said installation including for the purpose of effecting line deflection in the camera, delay means of controllable variable delay situated in the control unit and fed with line synchronising pulses available in said unit; means in said control unit for transmitting down a conductor of the cable to said camera unit pulses of a pre-determined polarity delayed with respect to said line synchronising pulses by an amount determined by said variable delay; means in the camera unit for utilising the pulses fed down said conductor to effect line deflection in the camera in said camera unit; means also in the camera unit and connected to the deflection system of said camera for transmitting back along the aforesaid conductor to said control unit pulses of opposite polarity to those transmitted down said conductor from the control unit; and phase comparator means situated in said control unit for comparing the phase of pulses received in said unit from said conductor with the phase of the available line synchronising pulses, said controllable variable delay means being responsive to the output from said phase comparator means for controlling the delay provided by the controllable variable delay means so as to maintain the deflection in the camera substantially in correct phase.

2. An installation as claimed in claim 1 wherein said means for utilising the pulses fed down the cable conductor to effect line deflection in the camera include a transistorised output stage feeding the deflection system of the camera and fed with input derived from said pulses.

3. An installation as claimed in claim 1 wherein further delay means for providing a delay which is fixed is interposed in the channel between the variable delay device and the camera.

4. An installation as claimed in claim 3 wherein said further delay means is adjustable.

5. An installation as claimed in claim 1 wherein said delay means in the control unit comprises a D.C. voltage controllable variable delay means fed with the available line synchronising pulses, said control unit further comprising pulse forming means fed with the output from said variable delay means and connected to supply pulses of one pre-determined polarity to the control unit end of said cable conductor, a saw tooth generator controlled by pulses of opposite polarity received at the control unit end of the cable conductor and fed thereto from the camera unit, said phase comparator means having one input fed with output from the saw tooth generator and another input fed with pulses derived from the available line synchronising pulses for providing an output D.C. voltage representative of the phase relation between the two inputs of said comparator means, and means for applying said D.C. voltage to control the delay of the variable delay means.

6. An installation as claimed in claim 1 wherein the camera unit includes output stage driver means fed with pulses of one predetermined polarity received at the camera unit end of said cable conductor, transistorised output stage means driven by said driver means for driving the deflection system of the camera, and means for deriving from line frequency voltages set up in said deflection system pulses of polarity opposite to said one predetermined polarity and for supplying said derived pulses to the camera unit end of the cable conductor.

7. An installation as claimed in claim 1 wherein the delay means of controllable variable delay comprises a condenser connected in a charging circuit including a first transistor; means for applying control voltage to the base of said transistor to control the charging current rate; a second transistor which is normally cut off and is connected across said condenser; means for applying available line synchronising pulses to the base of said second transistor to render the same momentarily conductive at the commencement of each such pulse; a point of reference potential; a regenerative circuit including two further transistors connected with said point of reference potential; and means actuated when the voltage across the condenser exceeds the reference potential at said point of reference potential for causing said two further transistors temporarily to provide a heavily conducting path across said condenser.

8. An installation as claimed in claim 6 further comprising fixed delay means of adjustable delay connected between the camera unit end of said conductor and said output stage driver means.

9. In a television camera installation, a television camera unit, a control unit remote from said camera unit and cable means interconnecting said camera unit and said control unit; said cable means including a control conductor; said control unit including means for receiving synchronising signals, voltage variable delay means for passing pulses along said control conductor to said camera unit; said camera unit comprising means responsive to said pulses from said variable delay means for providing television camera line deflection, and means responsive to television camera line deflection for passing further pulses from said camera unit to said control unit along said control conductor; said control unit further comprising phase comparator means for comparing the phase of said synchronising signals and said further pulses passed along said control conductor from said camera unit for applying a control voltage to said voltage variable control means.

10. A television camera installation according to claim 9 further comprising additional time delay means electrically connected with said control conductor for delaying pulses passed thereon for separating said pulses passed to said camera unit on said conductor from said further pulses passed from said camera unit on said conductor.

References Cited

UNITED STATES PATENTS

| | | | |
|---|---|---|---|
| 2,704,307 | 3/1955 | Gillett et al. | 178—69.5 |
| 2,752,424 | 6/1956 | Pugsley | 178—69.5 |
| 3,165,585 | 1/1965 | James | 178—69.5 |
| 3,184,545 | 5/1965 | Legler et al. | 178—69.5 |
| 3,337,688 | 8/1967 | Hiatt | 178—69.5 |
| 3,368,034 | 4/1968 | Dischert et al. | 178—69.5 |

ROBERT L. GRIFFIN, *Primary Examiner.*

ALFRED H. EDDLEMAN, *Assistant Examiner.*

U.S. Cl. X.R.

178—69.5